United States Patent
DeNap et al.

(10) Patent No.: US 7,072,475 B1
(45) Date of Patent: Jul. 4, 2006

(54) OPTICALLY COUPLED HEADSET AND MICROPHONE

(75) Inventors: Frank A. DeNap, Millbrae, CA (US); Timothy Roscoe, San Francisco, CA (US); Arvid Evans, Suisun City, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1015 days.

(21) Appl. No.: 09/893,136

(22) Filed: Jun. 27, 2001

(51) Int. Cl.
*H04R 1/10* (2006.01)

(52) U.S. Cl. ............. 381/74; 381/172; 398/134; 398/141; 455/569.1

(58) Field of Classification Search ............ 381/74, 381/375, 370, 309–311, 172; 700/94; 398/90, 398/132–134, 140–142
See application file for complete search history.

(56) References Cited

U.S. PATENT DOCUMENTS

| | | | | |
|---|---|---|---|---|
| 2,835,744 A | * | 5/1958 | Harris | 381/172 |
| 3,781,092 A | * | 12/1973 | Sussman et al. | 359/227 |
| 4,543,961 A | * | 10/1985 | Brown | 600/480 |
| 4,956,877 A | * | 9/1990 | Kroll et al. | 398/170 |
| 5,333,205 A | * | 7/1994 | Bogut et al. | 381/172 |
| 5,524,275 A | | 6/1996 | Lindell | |
| 5,812,295 A | * | 9/1998 | Kitasagami | 398/38 |
| 5,854,970 A | | 12/1998 | Kivela | |
| 6,055,500 A | * | 4/2000 | Terui et al. | 704/270 |
| 6,154,301 A | * | 11/2000 | Harvey | 398/213 |
| 6,166,707 A | | 12/2000 | Painter et al. | |
| 2001/0034253 A1 | * | 10/2001 | Ruschin | 455/569 |

FOREIGN PATENT DOCUMENTS

| | | |
|---|---|---|
| JP | 3-238936 | 10/1991 |
| JP | 4-220851 | 8/1992 |

* cited by examiner

*Primary Examiner*—Huyen Le
*Assistant Examiner*—Corey Chau

(57) ABSTRACT

Apparatus and methods for transferring audio between a headset and electronic equipment over an optical link. The apparatus includes an electro-optical interface for electrically connecting to the electronic equipment, an optical link, and an electro-optical headset. Audio from the electronic equipment modulates a light source in the electro-optical interface. A modulated light signal is transmitted through the optical link to the electro-optical headset where it is demodulated and reproduced as the original audio in the ear of a user wearing the headset. Also, another audio from the user's mouth produces another modulated light signal in the electro-optical headset. The other modulated light signal is transmitted through the optical link to the electro-optical interface where it is demodulated to provide the other audio to the electronic equipment. The non-electrical optical link may improve audible communications between the electronic equipment and the headset in radio-frequency noisy environments. Also, the non-electrical optical link may prevent coupling with an aerial of the electronic equipment and improve radio propagation.

16 Claims, 9 Drawing Sheets

FIG. 1

PRIOR ART

OPTICALLY COUPLED HEADSET AND MICROPHONE

FIELD OF INVENTION

The present invention relates to electronic equipment having an audio output and/or input. More specifically, it relates to a headset and/or microphone that are optically coupled to the electronic equipment.

BACKGROUND OF THE INVENTION

Many pieces of electronic equipment produce an audio output, receive an audio input, or both. For example, conventional or cellular telephones, walkie-talkies, compact disc players, home audio equipment, portable radio receivers, and micro-cassette recorders involve providing audible communications to a user, or involve accepting audible communications from the user. In order to reduce the effects of ambient audible noise interfering with the audible communications, or to increase the user's privacy, the user may connect an headset and/or microphone to the equipment. In this manner, the user may hear the audible communications through the headset and/or speak the audible communications into the microphone. The headset may integrate the microphone into a single unit for wearing by the user.

The headset typically connects electrically to the electrical equipment through a conductive wire. An audio signal that is an electrical representation of the audible communications travels from the electrical equipment to the headset through the conductive wire. The headset is typically an electromagnetic or piezoelectric device that responds to the current or voltage on the conductive wire, and vibrates in response to the audio signal to reproduce the audible communication.

Similarly, the microphone also typically connects electrically to the electrical equipment through a conductive wire. The microphone is typically a piezoelectric or ribbon magnetic device that responds to the audible communications from the user, and converts the audible communications into an audio signal that is an electrical representation of the audible communications. The audio signal travels from the microphone to the electrical equipment through another conductive wire.

SUMMARY OF THE INVENTION

An electrical coupling such as conductive wires, however, may introduce interference that degrades the audio signals. External radio-frequency ("RF") sources may induce interference into an electrical coupling. For example, in an aircraft cockpit, whether civilian or military, external RF sources may induce currents in the lengthy sheathing of the conductive wires from the electrical equipment to the pilot's headset. The induced currents degrade the audio signals going to the headset or interfere with front-end electronics on the equipment side. Also, because the microphone in the pilot's headset is a piezoelectric or ribbon microphone whose small voltage or current is not amplified before it goes through the conductive wires to the equipment, the external RF source may induce voltages or currents that overwhelm the audio signal. Also, for devices such as portable radio receivers, the conductive wires may act as extensions of the receiver's aerial. The proximity of the conductive wires with the user may alter characteristics of the aerial and degrade RF reception by the receiver. Thus electrical coupling of the headset and/or the microphone to the electrical equipment may impair the performance of the electrical equipment and the transfer of the audible communications.

It is therefore desirable to provide a non-electrical connection between the electronic equipment and the headset and/or microphone that reduces induced currents and voltages due to external radio-frequency sources. The non-electrical connection may improve audible communications between the electronic equipment and the headset and/or microphone. The non-electrical connection may also prevent coupling with the aerial of electronic equipment operating at radio frequencies.

One aspect of the invention relates to an electro-optical headset. The electro-optical headset includes an optical driver for receiving a first electrical signal representative of audio and for producing a modulated light signal based on the first electrical signal. The electro-optical headset also includes an optical link having a first end and a second end. The first end is coupled to the optical driver for receiving the modulated light signal. The electro-optical headset further includes an optical receiver coupled to the second end of the optical link for receiving the modulated light signal and demodulating the modulated light signal to produce a second electrical signal representative of the audio. The electro-optical headset yet further includes a headset speaker element electrically connected with the optical receiver for receiving the second electrical signal and producing sound waves based on the second electrical signal.

Another aspect of the invention relates to an electro-optical microphone. The electro-optical microphone includes an optical transceiver for producing a source light and for receiving a modulated light signal, and for producing a first electrical signal representative of audio based on the modulated light signal. The electro-optical microphone also includes an optical link having a first end and a second end. The first end is coupled to the optical transceiver for receiving the source light and for transmitting the modulated light signal. The electro-optical microphone further includes a microphone element coupled to the second end of the optical link for receiving the source light and modulating the source light to produce the modulated light signal representative of the audio. The microphone element is coupled to the second end of the optical link for transmitting the modulated light signal.

Yet a further aspect of the present invention relates to a method for reproducing audio in an electro-optical headset. The method includes receiving a first electrical signal representative of the audio and producing a modulated light signal based on the first electrical signal. The method also includes transporting the modulated light signal through an optical link to an optical receiver and demodulating the modulated light signal in the optical receiver to produce a second electrical signal representative of the audio. The method further includes reproducing the audio in a headset speaker element by applying the second electrical signal to the headset speaker element.

Another aspect of the present invention relates to a method for receiving audio from an electro-optical microphone. The method includes producing a source light in an optical transceiver and transporting the source light through an optical link from the optical transceiver to a microphone element. The method also includes modulating the source light in the microphone element to produce a modulated light signal representative of the audio and transporting the modulated light signal through the optical link from the microphone element to the optical transceiver. The method further includes demodulating the modulated light signal in the optical transceiver to produce a first electrical signal representative of the audio.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
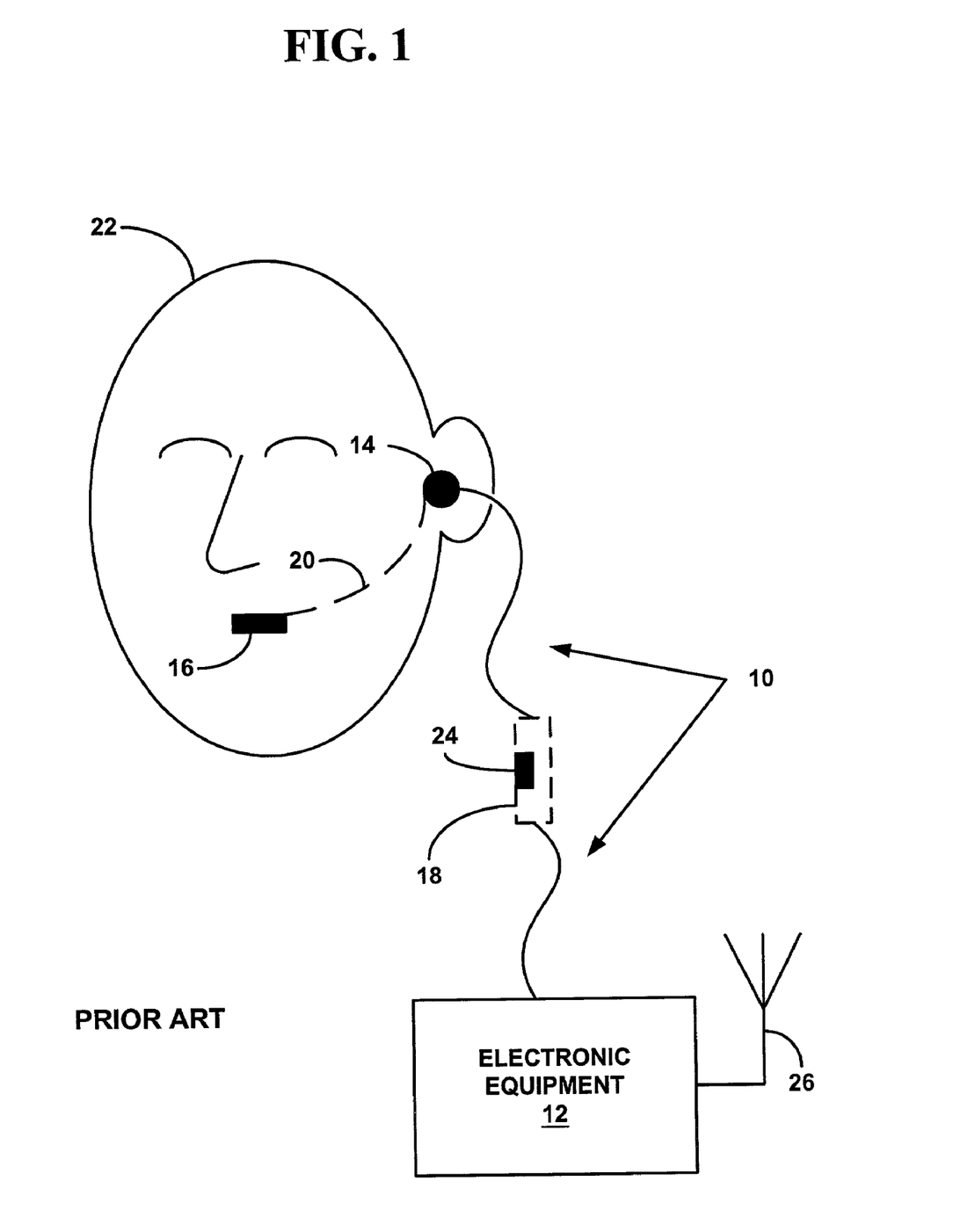
FIG. 1 is a block diagram illustrating components of an electrical coupling between electronic equipment and a headset and/or microphone.

FIG. 1 is a block diagram illustrating components of an electrical coupling 10 between electronic equipment 12 and a headset 14 and/or microphone 16, 18. In an integrated configuration, the microphone 16 may suspend from the headset 14 by a boom 20. A user 22 places the headset on his head, locating the headset 14 proximate to or within his ear, and locating the microphone 16 proximate to his mouth. Alternatively, a mounting 24 along the electrical coupling 10 may have an integrated microphone 18. The mounting 24 hangs from the headset 14 such that the integrated microphone 18 is level with the mouth of the user 22. It should be understood, however, that the configuration and relationship of the headset 14 and microphones 16, 18 of FIG. 1 are for illustrative purposes. Other configurations are possible, such as a hand-held microphone, a lapel microphone, or integrated earpieces in a flight helmet. In general, the microphone 16, 18 may be wearable on clothing or accessories such as spectacles, integrated into wearable headgear, or mechanically connected to the headset 14.

The electrical coupling 10 is typically shielded cable whose core includes a wire for conducting audio signals from the electronic equipment 12 to the headset 14, another wire for conducting audio signals from the microphone 16, 18 to the electronic equipment 12, and independent or common sheathing that acts as a return conductive path, also known to those of ordinary skill in the art as a "ground" path, for either or both the headset 14 and/or the microphone 16, 18.

External RF sources, however, may induce currents in the sheathing of the electrical coupling 10 that degrade the audio signals or interfere with front-end electronics in the electronic equipment 12. Additionally, the sheathing of the electrical coupling 10 may act as an aerial when connected to electronic equipment 12 operating at radio frequencies and interfere with RF transmission from an aerial 26 attached to the electronic equipment 12.

Figure 2:
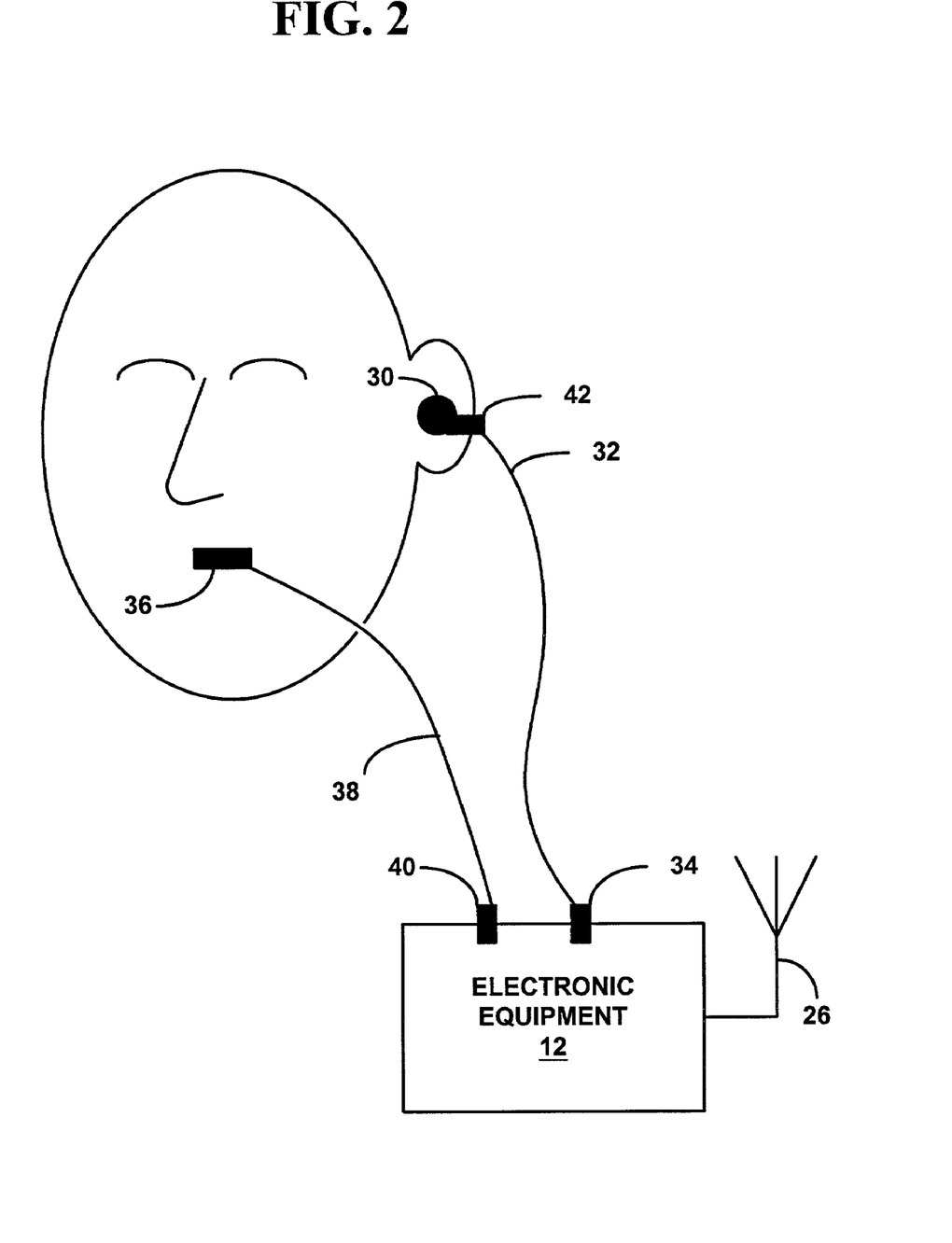
FIG. 2 is a block diagram illustrating a preferred electro-optical headset apparatus and a preferred electro-optical microphone apparatus.

The problems with the electrical coupling 10 may be overcome by optically coupling the headset and/or microphone to the electronic equipment 12. FIG. 2 is a block diagram illustrating a preferred electro-optical apparatus for transferring audio from electronic equipment 12 to a headset speaker element 30, herein termed an "electro-optical headset," and a preferred electro-optical apparatus for transferring audio from a microphone 36 to the electronic equipment 12, herein termed an "electro-optical microphone." The electro-optical headset transports modulated light that is representative of the audio from the electronic equipment 12, through an optical link 32, to an optical receiver 42. Similarly, the electro-optical microphone transports modulated light that is representative of the audio from the microphone 36, through another optical link 38, to the electronic equipment 12. The optical links 32, 38 may improve audible communications between the electronic equipment 12 and the headset speaker element 30 and/or microphone 36, and may also prevent coupling with the aerial of electronic equipment 12 operating at radio frequencies.

It should be understood, however, that the configuration and relationship of the headset speaker element 30 and microphone 36 shown in FIG. 2 are for illustrative purposes. Other configurations are possible, such as a hand-held microphone, a lapel microphone, or a headset integrated into a flight helmet. In general, the microphone 36 may be wearable on clothing or accessories, such as spectacles. The microphone 36 may also be integrated into wearable headgear, or mechanically connected to the headset speaker element 30, and the present invention is not limited to the preferred embodiments described herein and illustrated in FIG. 2.

Electro-Optical Headset

The electro-optical headset apparatus 30–34, 42 includes an optical driver 34 for receiving a first electrical signal representative of audio and for producing a modulated light signal based on the first electrical signal. The electro-optical headset 30–34, 42 also includes an optical link 32 that is coupled to the optical driver 34 for receiving the modulated light signal. An optical receiver 42 in the apparatus receives the modulated light signal from the optical link 32 and demodulates the modulated light signal to produce a second electrical signal representative of the audio. The apparatus also includes a headset speaker element 30 that is electrically connected with the optical receiver 42 and that receives the second electrical signal to produce sound waves based on the second electrical signal.

Figure 3:
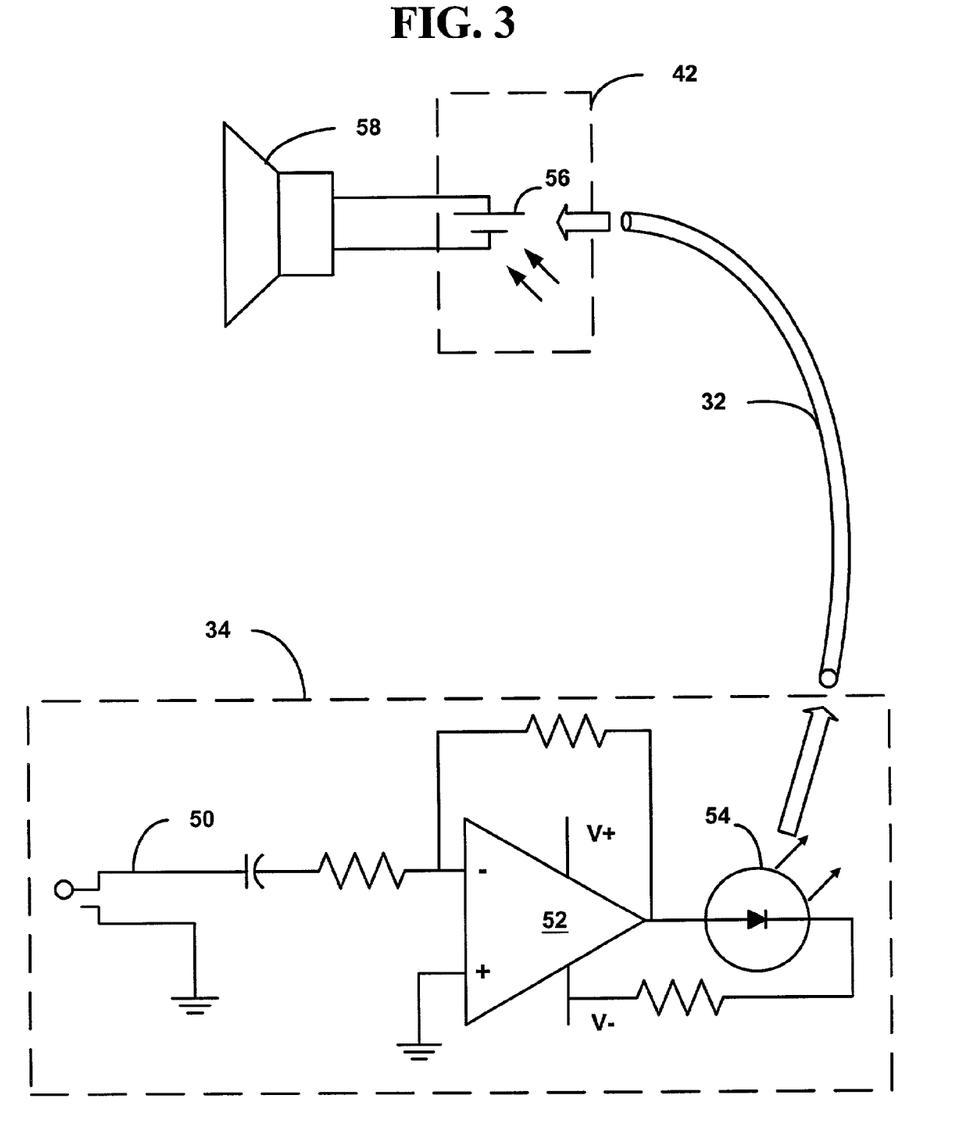
FIG. 3 is a block diagram illustrating a preferred embodiment of the electro-optical headset apparatus of FIG. 2.

FIG. 3 is a block diagram illustrating a preferred embodiment of the electro-optical headset 30–34, 42 of FIG. 2. The optical driver 34 receives electrical signals from the electronic equipment 12. The optical driver 34 may electrically couple to the electronic equipment 12 by an electrical audio connector 50 that inserts into a corresponding connector in the electrical equipment 12. For example, the electrical audio connector 50 may be an audio jack plug, familiar to those of ordinary skill in the art, that inserts into a corresponding socket in the electronic equipment 12.

The audio signal to be transferred to the optical receiver 42 and headset speaker element exits in the form of the first electrical signal from the electronic equipment 12 through the connector 50 and modulates a light source 54, such as a light emitting diode ("LED") 54. In a preferred embodiment, the light source 54 is a coherent light or laser LED.

The first electrical signal from the electronic equipment 12 modulates the light source 54, for example by a modulation circuit 52. The modulation circuit 52 may vary the light source 54 in response to the first electrical signal under a variety of modulation schemes. For example, as illustrated in FIG. 3, the modulation circuit 52 may vary the intensity of the light source 54 in response to the first electrical signal, a process commonly referred to as amplitude modulation by those of ordinary skill in the art. In another example, the modulation circuit 52 may vary the frequency of pulses from the light source 54 in response to the first electrical signal, a process commonly referred to as frequency modulation by those of ordinary skill in the art. In yet another example, the modulation circuit 52 may vary the duration of pulses from the light source 54 in response to the first electrical signal, a process commonly referred to as pulse width modulation by those of ordinary skill in the art. In a preferred embodiment, the light source 54 is a laser LED whose luminance varies in response to the first electrical signal according to a pulse width modulation scheme. The modulation circuit 52 may also amplify the first electrical signal before modulation or match impedance between the electrical equipment 12 and the light source 54.

It should be understood, however, that the preferred embodiments are not limited to the circuit elements illustrated in FIG. 3 and that other circuit elements are possible. For example, the light source 54 may be an infra-red, visible light, or laser LED. Alternatively, the light source 54 may be an incandescent, fluorescent, or bioluminescent light source. Additionally, the modulator circuit 52 may include an operational amplifier, transistor, or other active circuit element or elements that may amplify or match impedance as is familiar to those of ordinary skill in the art.

The output from the light source 54 enters one end of the optical link 32 where it is transported to the other end of the optical link 32. In a preferred embodiment, the optical link 32 is an optical fiber or an optical pipe. Optical fibers are typically composed of silica or other glassy material that guide light from one end to the other without significant attenuation in the intensity of the light. Optical pipes, on the other hand, are typically composed of plastic material that similarly guide light from one end to the other. Both types of optical link 32 transmit light without significant attenuation under a wide range of mechanical bending that deviates from a straight line. In this manner, the optical link 32 transports light from the position of the optical driver 34 at the electronic equipment 12 to the position of the headset 30 substantially regardless of the physical shape of the optical link 32. Also, due to the dielectric material of which it is constructed, the optical link 32 does not conduct electricity, is immune to RF interference, and can operate in RF-noisy environments, such as the cockpit of an airplane, without degrading the quality of the audio signal. Additionally, in the proximity to electronic equipment 12 with an aerial 26 that operates at radio frequencies, the optical link 32 does not provide any conducting paths that may interact with the aerial 26 and may alter the RF characteristics of the aerial 26.

In a preferred embodiment, the optical receiver 42 is a photo-voltaic cell 56 that produces a voltage in response to the intensity of light that the photo-voltaic cell 56 receives. The photo-voltaic cell 56 receives modulated light from the other end of the optical link 32 and produces a voltage at its terminals. The photo-voltaic cell 56 connects to the headset speaker element 30 that vibrates in response to the voltage of the photo-voltaic cell 56. In a preferred embodiment, the headset speaker element 30 is a piezoelectric headset speaker element 58. The voltage across the terminals of the photo-voltaic cell 56 represents a preferred embodiment of the second electrical signal, which causes the piezoelectric headset speaker element 58 to vibrate and produce sound waves. The sound waves correlate with the audio received by the optical driver 34 from the electronic equipment 12, and reproduce the audio in the ear of the user 22. In an alternative preferred embodiment, the headset speaker element 30 is an electromagnetic headset speaker element (not shown). The voltage across the terminals of the photo-voltaic cell 56 produces a current that flows through the electromagnetic headset speaker element. The current represents another preferred embodiment of the second electrical signal that causes the electromagnetic headset speaker element to vibrate and produce the sound waves.

Figure 4A:
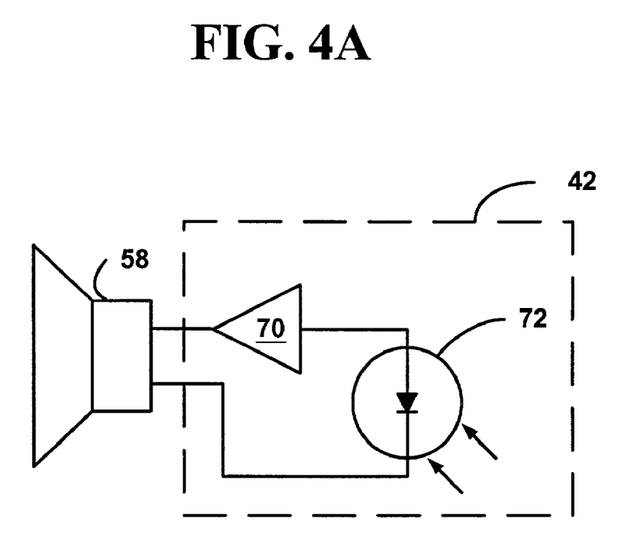
FIG. 4 is a block diagram illustrating preferred embodiments of the electro-optical headset apparatus of FIG. 2.

In another preferred embodiment, the optical receiver 42 includes demodulation circuitry. FIG. 4A is a block diagram illustrating an alternative preferred embodiment of the optical receiver 42 and headset speaker element 30. The modulated light signal from the optical link 32 illuminates a photo-detector 72 in the optical receiver 42. The photo-detector 72 may be a photodiode, photo-voltaic cell 56, or other semiconductor device that is responsive to light, for example a phototransistor. A third electrical signal that is present across the photo-detector 72 corresponds to the modulated light signal received from the optical link 32. The demodulator circuit 70 converts the third electrical signal across the photo-detector 72 into the second electrical signal that is representative of the original audio received by the optical driver 34 from the electronic equipment 12. The demodulator circuit 70 may also amplify the third electrical signal. The headset speaker element 30 receives the second electrical signal and reproduces the audio in the user's 22 ear. In this preferred embodiment, the headset speaker element 30 may be a piezoelectric headset speaker element 58 or an electromagnetic headset speaker element (not shown) and the optical receiver 30 may include one or more batteries (not shown) to provide power to the amplifier circuit 70.

Figure 4B:
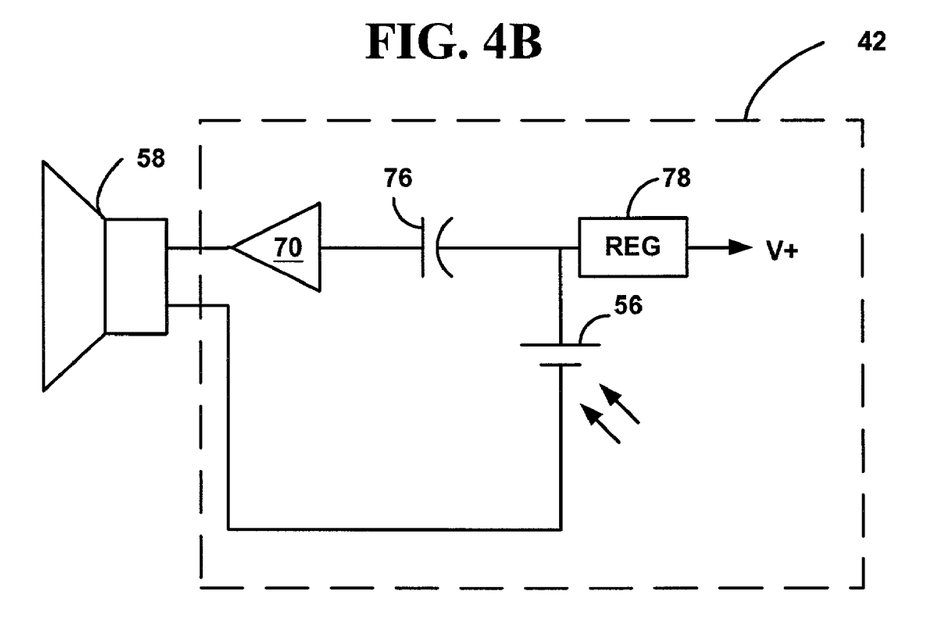

In another alternative preferred embodiment, the optical receiver 42 includes demodulation circuitry 70 that is powered by a photo-voltaic cell 56. FIG. 4B is a block diagram illustrating the alternative preferred embodiment of the optical receiver 42 and headset speaker element 30. The photo-voltaic cell 56 receives the modulated light signal from the optical driver 34 through the optical link 32. The modulated light signal represents the audio and produces the third electrical signal across the photo-voltaic cell 56. A capacitor 76 or similar device separates the alternating current ("AC") component of the third electrical signal from a direct current ("DC") voltage of the photo-voltaic cell 56. The demodulator circuit 70 converts the AC electrical signal into the second electrical signal that is representative of the original audio received by the optical driver 34 from the electronic equipment 12. The demodulator circuit 70 may also amplify the third electrical signal. The piezoelectric speaker element 58 or electromagnetic speaker element receives the second electrical signal and reproduces the audio from the electronic equipment 12 in the user's 22 ear. Additionally, a regulator circuit 78 regulates the DC voltage across the photo-voltaic cell 56 to provide a substantially constant DC voltage that powers the demodulator circuit 70. In order to power the optical receiver 42 in this manner, the light source 54 in the optical driver 34 sends sufficient light through the optical link 32 to maintain an operable DC voltage across the photo-voltaic cell 56.

To power the embodiment of FIG. 4B, the light source 54 of FIG. 3 is preferably a laser LED that produces a quiescent light intensity when the optical driver 34 receives no electrical signals from the electronic equipment 12. For example, in the embodiment of the optical driver 34 of FIG. 3, the laser LED 54 is forward biased and produces this quiescent light when the optical driver 34 receives no electrical signals. The quiescent light powers the demodulator circuit 70 in the absence of a first electrical signal from the electronic equipment 12. When the first electrical signal from the electronic equipment 12 arrives in the optical driver 34, it modulates the light from the laser LED 54. In operation, the average intensity of the modulated light is sufficient illumination of the photo-voltaic cell 56 to provide a DC voltage that powers the demodulator circuit 70 after regulation by the regulator circuit 78.

In the preferred embodiments described above, the demodulation circuit 70 may include one or more operational amplifiers, transistors, or other active circuit element that are familiar to those of ordinary skill in the art. The demodulator circuit 70 may also comprise discrete electronic components, monolithic integrated circuits, or a combination of both. Also, the regulator circuit 78 may be constructed according to methods and components familiar to those of ordinary skill in the art. For example, the regulator circuit 78 may comprise a capacitor and Zener diode (not shown) or may comprise a monolithic integrated circuit that produces a constant output voltage over a wide range of variable input voltages.

In operation, the electro-optical headset 30–34, 42 of FIG. 2 to FIG. 4 receives a first electrical signal representative of the audio and produces a modulated light signal based on the first electrical signal. The electro-optical headset 30–34, 42 transports the modulated light signal through the optical link 32 to the optical receiver 42. The electro-optical headset 30–34, 42 demodulates the modulated light signal in the optical receiver 42 to produce a second electrical signal representative of the audio and reproduces the audio in a headset speaker element 30 by applying the second electrical signal to the headset speaker element 30.

Electro-Optical Microphone

The electro-optical microphone apparatus 36–40 includes an optical transceiver 40 for producing a source light and for receiving a modulated light signal. The optical transceiver 40 also produces a first electrical signal representative of audio based on the modulated light signal. The electro-optical microphone 36–40 also includes an optical link 38, one end of which is coupled to the optical transceiver 40. The end receives the source light from, and transmits the modulated light signal to, the optical transceiver 40. The electro-optical microphone 36–40 also includes a microphone element 36 coupled to the other end of the optical link 38 for receiving the source light and modulating the source light to produce the modulated light signal representative of the audio. The microphone element 36 is also coupled to the other end of the optical link 38 for transmitting the modulated light signal.

Figure 5:
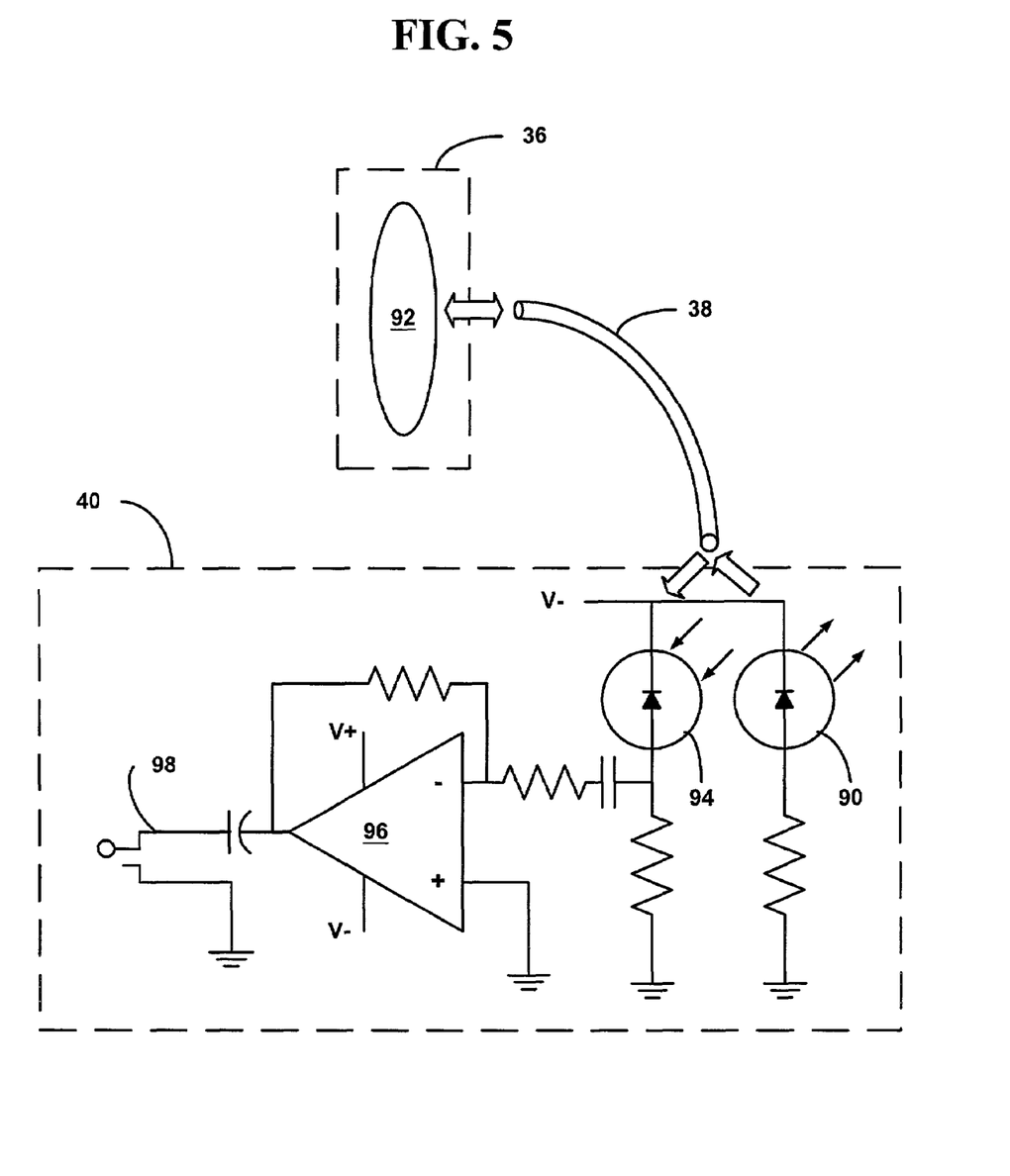
FIG. 5 is a block diagram illustrating a preferred embodiment of the electro-optical microphone apparatus of FIG. 2.

FIG. 5 is a block diagram illustrating a preferred embodiment of the electro-optical microphone 36–40 of FIG. 2. The optical transceiver 40 includes a light source 90 producing the source light that the optical link 38 transports to the microphone element 36. The source light is modulated by the microphone element 36 to produce the returned light. The optical link 38 also transports the returned modulated light signal to the optical transceiver 40 where it is received by an photo-detector 94 and demodulated by a demodulator circuit 96. The photo-detector 94 may be a phototransistor, photodiode, or other semiconductor device whose electrical characteristics vary with respect to illumination. The demodulator circuit 96 may also produce the first electrical signal that is representative of the audio. In addition, the electronic equipment 12 may receive the first electrical signal through an electrical audio connector 50, such as an audio jack plug, that inserts into a corresponding socket in the electronic equipment 12 as is familiar to those of ordinary skill in the art.

In one preferred embodiment, the microphone element 36 is a diaphragm 92 with a reflective surface. Sound waves from the user's 22 mouth, representative of the audio, cause the diaphragm 92 to vibrate. The reflective surface of the diaphragm 92 reflects the source light from the optical link 38 in different directions corresponding to the degree of deformation to produce the modulated light signal. The optical link 38 accepts the modulated light signal whose intensity varies with the degree of deformation of the reflective diaphragm 92 i.e. the reflective diaphragm 92 amplitude modulates the source light to produce the modulated light signal. The optical transceiver 40 accepts the returned light from the optical link 38 and demodulates the modulated light signal to produce the first electrical signal that is representative of the audio.

Figure 6:
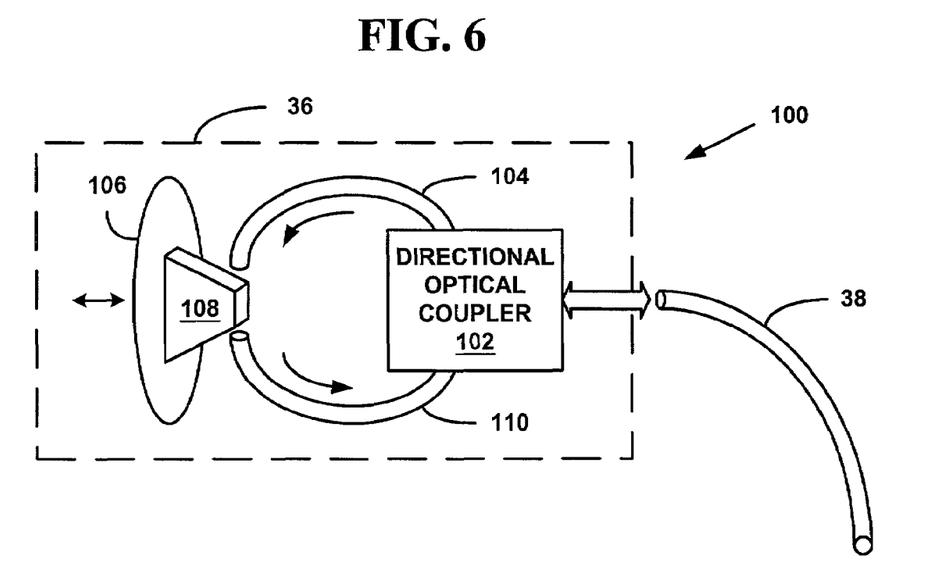
FIG. 6 is a block diagram illustrating a preferred embodiment of a microphone element in the electro-optical microphone apparatus of FIG. 2.

FIG. 6 is a block diagram illustrating another preferred embodiment 100 of the microphone element 36. The source light from the optical link 38 enters a directional optical coupler 102, which directs the source light through a first optical path 104. A diaphragm 106 has a translucent or semi-transparent wedge 108 attached to its back surface. Sound waves from the user's 22 mouth, representative of the audio, deform the diaphragm 106. The deformed diaphragm 106 interposes the wedge 108 between the first optical path 104 and a second optical path 110. As the wedge 108 is further interposed between the optical paths, the wedge 108 further attenuates the source light as it crosses from the first optical path 104 to the second optical path 110 because the source light has to pass through more of the translucent or semi-transparent material of which the wedge 108 is made. The degree of attenuation of the source light is representative of the audio. In this manner, the light in the second optical path 110 is amplitude modulated by the sound waves. The directional optical coupler 102 accepts the modulated light signal from the second optical path 110 and directs the modulated light signal to the optical link 38 where it is transported to the optical transceiver 40 for conversion to the first electrical signal that is representative of the audio.

The wedge 108 may be constructed of plastic or other material that is translucent or semi-transparent. The wedge 108 may have a trapezoidal cross section in the plane of the optical paths 104, 110, or the cross section of the wedge 108 may be shaped to compensate for a non-linear response of the diaphragm 106 and wedge 108 to the sound waves. The first optical path 104 between the directional optical coupler 102 and the wedge 108 and/or the second optical path 110 between the wedge 108 and the directional optical coupler 102 may be defined by reflection off mirrors (not shown) or by a refractive medium. The refractive medium may be a prism or other dielectric device that alters light propagating through it, or the refractive medium may be an optical fiber or optical pipe of the same or different material as the optical link 38. It should be understood, however, that the optical paths 104, 110 need not be defined wholly or partially within solid refractive media but may be defined in vacuum, liquid, or gaseous media, such as air.

Figure 7:
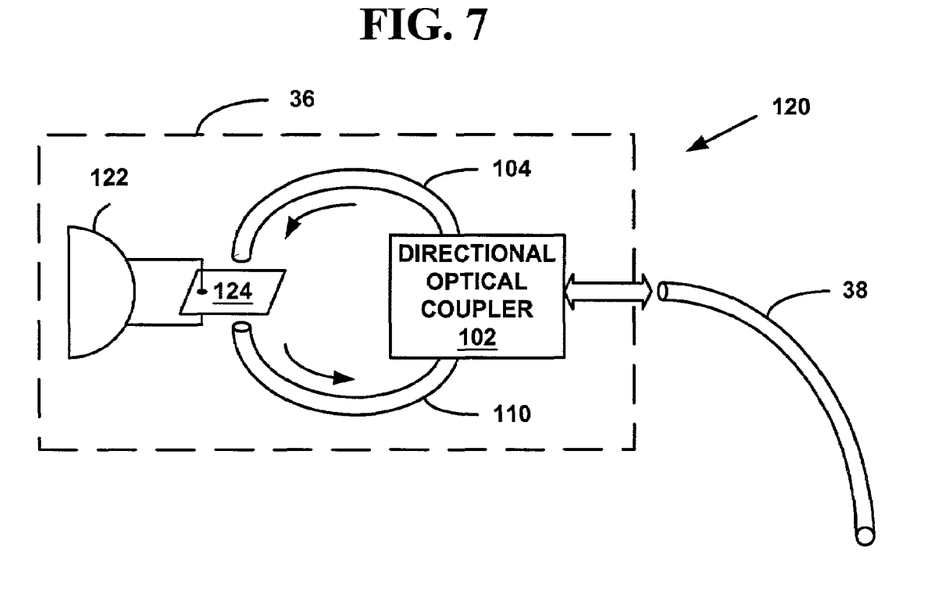
FIG. 7 is a block diagram illustrating another preferred embodiment of the microphone element in the electro-optical microphone apparatus of FIG. 2.

FIG. 7 is a block diagram illustrating another preferred embodiment 120 of the microphone element 36. The source light from the optical link 38 enters the directional optical coupler 102, which directs the source light through the first optical path 104. An electrical microphone 122, such as a piezoelectric microphone, generates a voltage that modulates the opacity of an electro-optical shutter 124. The opacity of the electro-optical shutter 124 varies in response to the voltage across the electro-optical shutter 124. As sound waves from the user's 22 mouth cause a second electrical signal across the electrical microphone 122 that is representative of the audio, the second electric signal varies the opacity of the electro-optical shutter 124 and correspondingly attenuates the source light. The degree of attenuation of the source light is representative of the audio. In this manner, the light in the second optical path 110 is amplitude modulated by the second electrical signal. The directional optical coupler 102 accepts the modulated light signal from the second optical path 110 and directs the modulated light signal to the optical link 38 where it is transported to the optical transceiver 40 for conversion to the first electrical signal that is representative of the audio.

In a preferred embodiment, the electro-optical shutter 124 is a liquid crystal display ("LCD") element familiar to those of ordinary skill in the art. The electrical microphone 122 may require resistor and/or capacitor circuit elements (not shown) in series and/or in parallel to match the response characteristics of the LCD element. The resistor and/or capacitor circuit elements may also be required to permit the discharge of any capacitor effect that the LCD element may have, as is known to those of ordinary skill in the art.

It should be understood, however, that the preferred embodiments are not limited to the optical, electrical, and/or mechanical elements illustrated in FIG. 5 to FIG. 7 and that other elements are possible. For example, the light source 90 may be an infra-red, visible light, or laser/coherent light LED. Alternatively, the light source 90 may be an incandescent, fluorescent, or bioluminescent light source. The demodulator circuit 96 may include an operational amplifier, transistor, or other active circuit element or elements that may amplify or match impedance as is familiar to those of ordinary skill in the art.

Additionally, the optical link 38 may comprise two or more optical pipes or optical fibers. One of the two optical pipes of fibers transports the source light from the light source 90 to the microphone element 36, regardless of whether the microphone element 36 contains the diaphragm 92 of FIG. 5, the wedge 108 of FIG. 6, or the electro-optical shutter 124 of FIG. 7. The other optical pipe or fiber transports the modulated light signal from these optical modulators 92, 108, 124 to the optical transceiver 40. In such a configuration with two optical pipes of fibers, the microphone element 36 need not include the directional optical coupler 102, and the first 104 and second 110 optical paths may each comprise the optical pipe or optical fiber coming from or returning to the optical transceiver 40.

Further, reflective microphone elements 36 are not limited to the diaphragms with reflective back surfaces 92 of FIG. 5 or the diaphragm 106 with the translucent or semi-transparent wedge 108 of FIG. 6. Other embodiments of the microphone element 36 are possible, such a Bragg grating, familiar to those of ordinary skill in the art, attached to a diaphragm that modulates the source light to produce the modulated light signal. Another embodiment of the microphone element 36 is a Bragg grating or Surface Acoustic Wave device that is electro-mechanically vibrated by an amplified voltage from a piezoelectric or electromagnetic microphone.

In a preferred embodiment, the directional optical coupler 102 of FIG. 6 and FIG. 7 is a bifurcated optical fiber, familiar to those of ordinary skill in the art, with one bi-directional input for attaching to the optical link 38, a unidirectional input for receiving the modulated light signal from the optical modulators 92, 108, 124, and a uni-directional output for transmitting the source light to the optical modulators 92, 108, 124. In alternative preferred embodiments, the directional optical coupler 102 is a prismatic optical device or a half-silvered mirror optical device for outputting the source light from the optical link 38 and inputting the modulated light signal to the optical link 38. It should be understood, however, that the directional optical coupler 102 of the present invention is not limited to these embodiments and that other embodiments of the directional optical coupler 102 are possible, such as dielectric, dichromatic, or polarization directional optical devices.

In operation, the electro-optical microphone 36–40 of FIGS. 5–7 produces a source light in an optical transceiver 40 and transports the source light through an optical link 38 from the optical transceiver 40 to a microphone element 36. The electro-optical microphone 36–40 modulates the source light in the microphone element 36 to produce a modulated light signal representative of the audio and transports the modulated light signal through the optical link 38 from the microphone element 36 to the optical transceiver 40. The electro-optical microphone 36–40 demodulates the modulated light signal in the optical transceiver 40 to produce a first electrical signal representative of the audio.

Electro-Optical Headset

Figure 8:
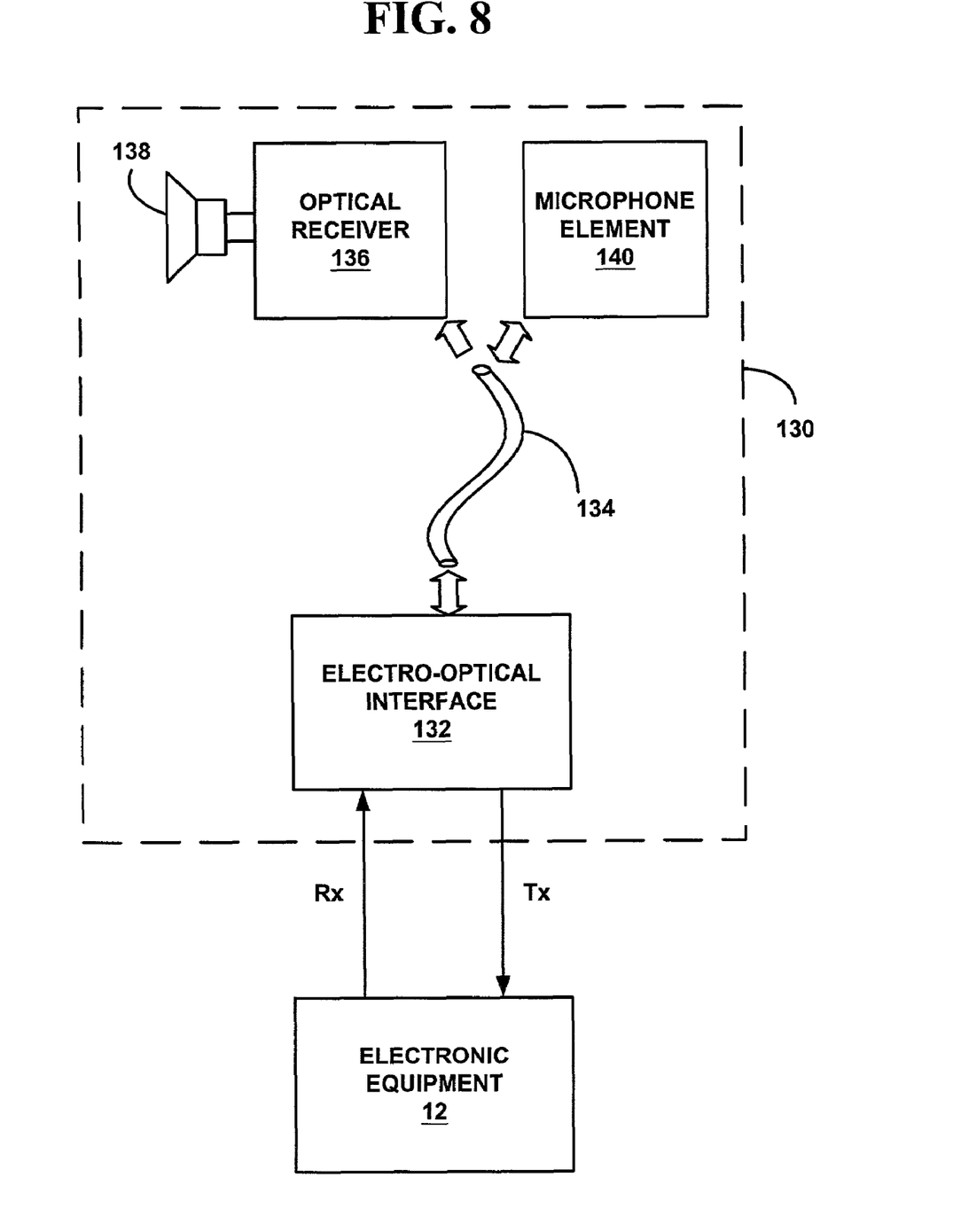
FIG. 8 is a block diagram illustrating a preferred embodiment of an electro-optical headset.

The electro-optical headset 30–34, 42 and electro-optical microphone 36–40 are presented in FIG. 2 as having separate optical links 32, 38. A single optical link may transport audio in the form of light signals both to and from the headset. FIG. 8 is a block diagram illustrating a preferred embodiment of an electro-optical headset 130. The electro-optical headset 130 includes an electro-optical interface 132 for receiving a first electrical signal representative of first audio and for producing a first modulated light signal based on the first electrical signal. The electro-optical interface 132 is also for receiving a second modulated light signal and demodulating the second modulated light signal to produce a second electrical signal representative of second audio. The electro-optical headset 130 also includes an optical link 134 having a first end and a second end. The first end is coupled to the electro-optical interface 132 for receiving the first modulated light signal and for transmitting the second modulated light signal. Also included in the electro-optical headset 130 is an optical receiver 136, coupled to the second end of the optical link 134, for receiving the first modulated light signal and for demodulating the first modulated light signal to produce a third electrical signal representative of the first audio. The electro-optical headset 130 further includes a headset speaker element 138 electrically connected with the optical receiver for receiving the third electrical signal and producing first sound waves based on the third electrical signal. Additionally, the electro-optical headset 130 includes a microphone element 140 coupled to the second end of the optical link 134 for receiving the first modulated light signal and for transmitting the second modulated light signal. The microphone element 140 is also for modulating the first modulated light signal to produce the second modulated light signal representative of the second audio.

The electro-optical headset 130 may also electrically connect to the electronic equipment 12 through at least one electrical audio connector. The first audio, to be heard by the user 22 in the speaker element 138, passes through one electrical audio connector in the form of the first electrical signal from the electronic equipment 12 to the electro-optical interface 132. As is familiar to those of ordinary skill in the art, the electronic equipment 12, such as a mobile station, e.g. a walkie-talkie or a cellular telephone, may have an audio jack socket for connecting to an earpiece or headset and providing the first audio received ("Rx") by the electronic equipment 12 to the electro-optical headset 130. The electronic equipment 12, such as the mobile station, may also have another audio jack socket for connecting to an external microphone, for example the integrated microphone 18 in the mounting 24 of FIG. 1. The other audio jack socket receives the second audio from the electro-optical headset 130 to be transmitted ("Tx") by the walkie-talkie of cellular telephone. The electro-optical headset 130 connects to the audio jack sockets by corresponding audio jack plugs. Alternatively, both audio jack sockets may be combined into a dual audio jack socket, familiar to those of ordinary skill in the art, and the electro-optical headset 130 has a dual audio jack plug for connecting to the electronic equipment 12.

Figure 9:
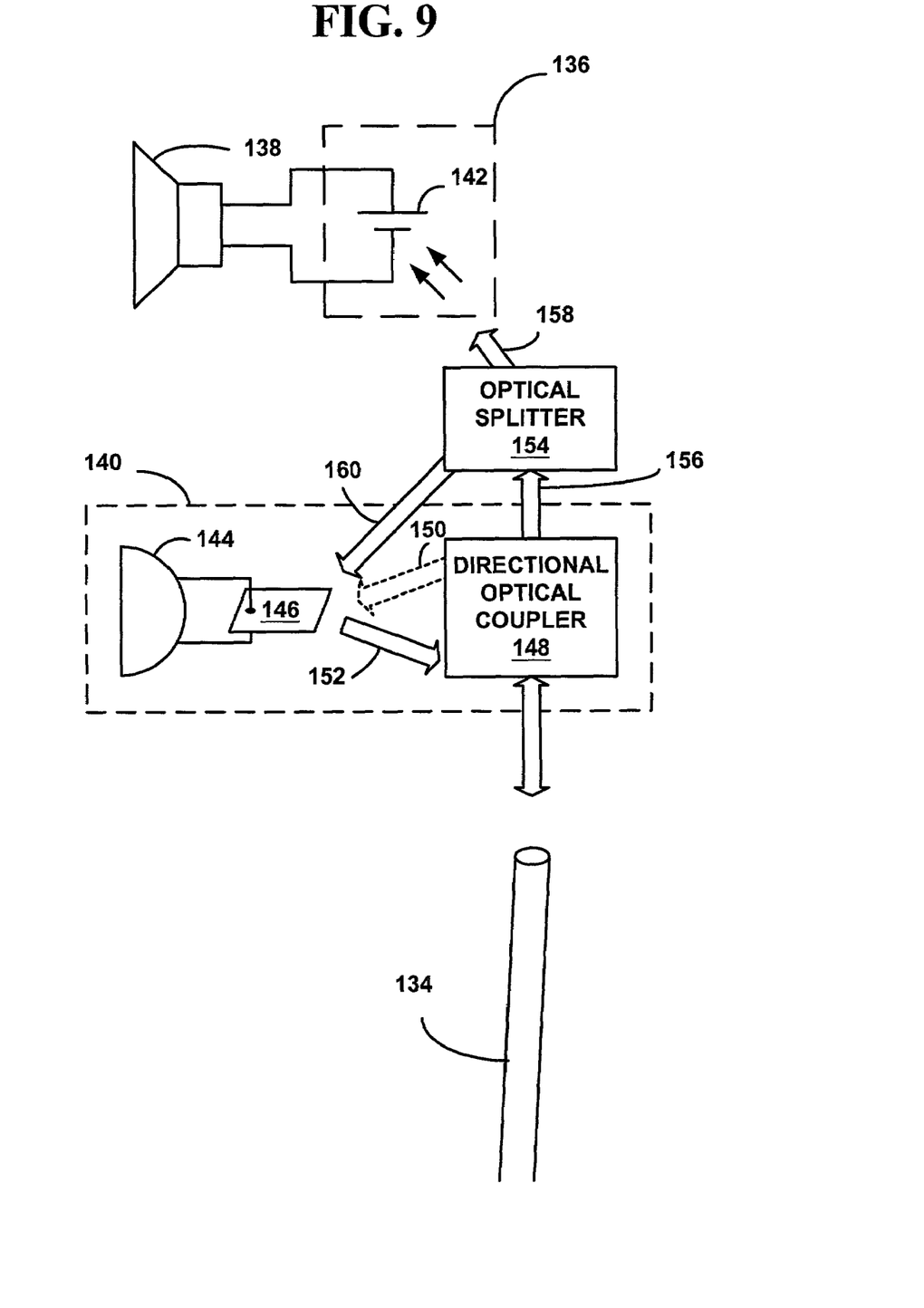
FIG. 9 is a block diagram illustrating preferred embodiments of an optical receiver and a microphone element in the electro-optical headset of FIG. 8.

FIG. 9 is a block diagram illustrating preferred embodiments of the optical receiver 136 and the microphone element 140 in the electro-optical headset 130 of FIG. 8. In a preferred embodiment, the optical receiver 136 is a photo-voltaic cell 142 that produces a voltage in response to the intensity of the first modulated light signal that the photo-voltaic cell 142 receives. The photo-voltaic cell 56 receives the first modulated light signal from the second end of the optical link 134 and produces a voltage at its terminals. The photo-voltaic cell 142 connects to the headset speaker element 138 that vibrates in response to the voltage of the photo-voltaic cell 142. In a preferred embodiment, the headset speaker element 138 is piezoelectric. The voltage across the terminals of the photo-voltaic cell 142 represents the third electrical signal that causes the piezoelectric headset speaker element 138 to vibrate and produce the first sound waves. The first sound waves correlate with the first audio received by the electro-optical interface 132 from the electronic equipment 12, and reproduce the first audio in the ear of the user 22. In an alternative preferred embodiment, the headset speaker element 138 is electromagnetic. The voltage across the terminals of the photo-voltaic cell 142 produces a current that flows through the electromagnetic headset speaker element 138. The current represents the third electrical signal that causes the electromagnetic headset speaker element 58 to vibrate and produce the first sound waves.

A preferred embodiment of the microphone element 140 includes an electrical microphone 144, an electro-optical shutter 146 and a directional optical coupler 148. The first modulated light signal from the optical link 134 enters the directional optical coupler 148, which directs the first modulated light signal through an input optical path 150 to the electro-optical shutter 146. The electrical microphone 144, such as a piezoelectric microphone, generates a voltage that modulates the opacity of the electro-optical shutter 146. The opacity of the electro-optical shutter 146 varies in response to the voltage across the electro-optical shutter 146. As the second sound waves from the user's 22 mouth cause a fourth electrical signal across the electrical microphone 144 that is representative of the second audio, the fourth electric signal varies the opacity of the electro-optical shutter 146 and correspondingly attenuates the first modulated light signal. The degree of attenuation of the first modulated light signal is representative of the second audio. In this manner, the light in an output optical path 152 is amplitude modulated by the fourth electrical signal. The directional optical coupler 148 accepts the second modulated light signal from the output optical path 152 and directs the second modulated light signal to the optical link 134 where it is transported to the electro-optical interface 132 for conversion to the second electrical signal that is representative of the second audio.

In a preferred embodiment, the electro-optical shutter 146 is a LCD element. The electrical microphone 144 may require resistor and/or capacitor circuit elements (not shown) in series and/or in parallel to match the response characteristics of the LCD element. The resistor and/or capacitor circuit elements may also be required to permit the discharge of any capacitor effect that the LCD element may have, as is known to those of ordinary skill in the art.

In another preferred embodiment, the electro-optical headset 130 includes an optical splitter 154 as illustrated in FIG. 9. Instead of directing the first modulated light signal along the input optical path 150 to the electro-optical shutter 146 of the microphone element 140, the directional optical coupler 148 directs the first modulated light signal to the optical splitter 154 along an alternative input optical path 156. The optical splitter 154 receives the first modulated light signal from the directional optical coupler 148 along the alternative input optical path 156, and directs the first modulated light signal along a first optical path 158 to the optical receiver 136 and along a second optical path 160 to the microphone element 140. In this manner, the optical splitter 154 provides the first modulated light signal to the optical receiver 136 for reproduction of the first audio, and provides the first modulated light signal to the microphone element 140 for further modulation by the second audio.

In a preferred embodiment, the optical splitter 154 is a bifurcated optical fiber, familiar to those of ordinary skill in the art, with one input for receiving the first modulated light signal from the directional optical coupler 148, and two outputs for transmitting the first modulated light signal to the microphone element 140 and the optical receiver 136. In alternative preferred embodiments, the optical splitter 154 is a prismatic optical device or a half-silvered mirror optical device. It should be understood, however, that the optical splitter 154 of the present invention is not limited to these embodiments and that other embodiments of the optical splitter 154 are possible, such as dielectric, dichromatic, or polarization optical devices.

Figure 10:
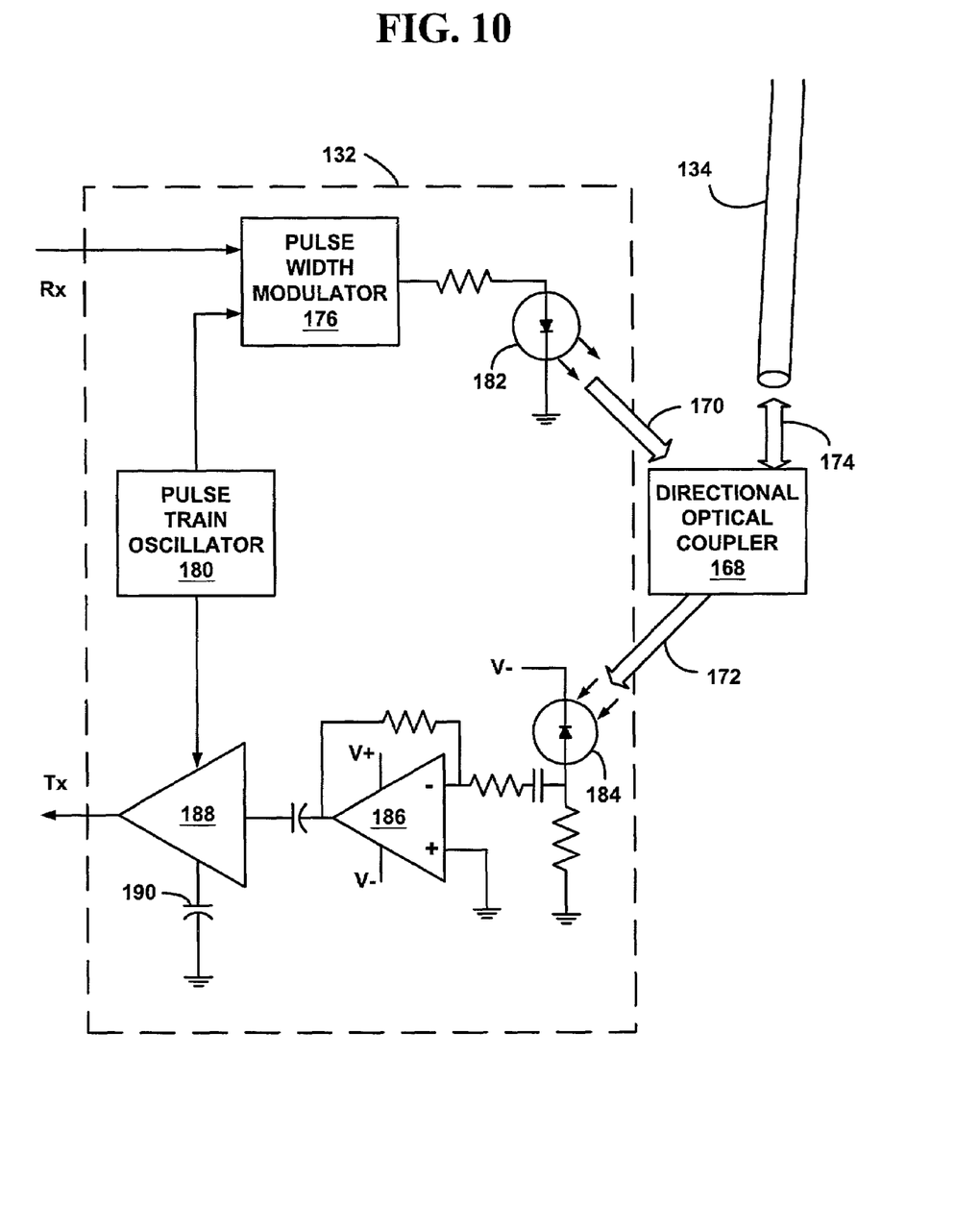
FIG. 10 is a block diagram illustrating a preferred embodiment of an electro-optical interface in the electro-optical headset of FIG. 8.

FIG. 10 is a block diagram illustrating a preferred embodiment of the electro-optical interface 132 in the electro-optical headset 130 of FIG. 8. The electro-optical interface 132 includes a pulse width modulation circuit 176 and a sample-and-hold circuit 188. Also included in the electro-optical interface 132 is a pulse train oscillator circuit 180 for synchronizing the beginning of each pulse of the first modulated light signal, and for controlling the sampling of the sample-and-hold circuit 188 to demodulate the second modulated light signal to provide the second electrical signal. In operation, the pulse train oscillator circuit 180 triggers the pulse width modulation circuit 176 to provide an electrical pulse whose duration is proportional to the amplitude of the first electrical signal received from the electrical equipment 12, which is representative of Rx, the first audio received from the electrical equipment 12. For example, the pulse width modulation circuit 176 may include a one-shot multivibrator circuit, familiar to those of ordinary skill in the art. The electrical pulse from the pulse width modulation circuit 176 drives a laser LED 182 to produce the first modulated light signal.

In a preferred embodiment, the pulse train oscillator circuit 180 provides triggering pulses at a frequency of far above audio frequencies, such as at 40 kiloHertz ("kHz"). The laser LED 182 transmits the light pulses of the first modulated light signal to a directional optical coupler 168 through a receiving optical path 170. The intensity of the first modulated light signal varies in proportion to the first electrical signal because each light pulse from the laser LED 182 is longer in duration in proportion to the first electrical signal. The directional optical coupler 168 receives the first modulated light signal and directs it to the first end of the optical link 132 through a two-way optical path 174. At the second end of the optical link 132, the optical receiver 136, such as the photo-voltaic cell 142 of FIG. 9, responds to the intensity of the first modulated light signal by providing the third electrical signal, which is approximately proportional to the intensity of the first modulated light signal. Due to the response of the photo-voltaic cell 142 to light pulses at a rate above audio frequencies, the third electrical signal is substantially similar to the first electrical signal.

The directional optical coupler 168 receives the second modulated light signal from the optical link 134 through the two-way optical path 174. The directional optical coupler 168 directs the second modulated light signal through a transmitting optical path 172 to a photo-detector 184 whose electrical properties change in proportion to the intensity of incident light. In a preferred embodiment, the photo-detector 184 is a semiconductor device, such as a photodiode or a phototransistor. The electro-optical interface 132 may include an amplifier circuit 186 for amplifying the electrical signal across the semiconductor device 184 before processing by the sample-and-hold circuit 188.

As is known to those of ordinary skill in the art, the output of the sample-and-hold circuit 188 responds to the amplitude modulated characteristics of the second modulated light signal and does not respond to the pulse width modulated characteristics of the second modulated light signal. The pulses of light of the second modulated light signal synchronize with the pulses from the pulse train oscillator circuit 180. The amplitude of each pulse, however, is proportional to the amplitude of the fourth electrical signal in the microphone element 140 of FIG. 9. Each triggering pulse from the pulse train oscillator circuit 180 causes the sample-and-hold circuit 188 to sample the output voltage of the amplifier circuit 186. Between triggering pulses, a holding capacitor 190 holds the output of the sample-and-hold circuit 188 at the last sampled output voltage of the amplifier. In this manner, the output of the sample-and-hold circuit 188, the second electrical signal, is proportional to the amplitude of the second modulated light signal, which in turn is proportional to the fourth electrical signal from the electrical microphone 144 of FIG. 9.

In a preferred embodiment, the directional optical coupler 148 of FIG. 9 and the directional optical coupler 168 of FIG. 10 are bifurcated optical fibers, familiar to those of ordinary skill in the art, each with one bi-directional input for attaching to the optical link 134. The directional optical coupler 148 of FIG. 9 has a uni-directional input for receiving the second modulated light signal from the electro-optical shutter 146, and a uni-directional output for transmitting the first modulated light signal to the electro-optical shutter 146 or the optical splitter 154. The directional optical coupler 168 of FIG. 10 has a uni-directional input for receiving the first modulated light signal from the electro-optical interface 132, and a uni-directional output for transmitting the second modulated light signal to the electro-optical interface 132. In alternative preferred embodiments, the directional optical couplers 148, 168 are prismatic optical devices or a half-silvered mirror optical devices. It should be understood, however, that the directional optical couplers 148, 168 of the present invention are not limited to these embodiments and that other embodiments of the directional optical coupler 148, 168 are possible, such as dielectric, dichromatic, or polarization directional optical devices.

In view of the wide variety of embodiments to which the principles of the invention can be applied, it should be understood that the illustrated embodiments are exemplary only, and should not be taken as limiting the scope of the present invention. For example, more or fewer elements or component may be used in the block diagrams.

We claim:

1. An electro-optical headset comprising:

an electro-optical interface for receiving a first electrical signal representative of first audio and for producing a first modulated light signal based on the first electrical signal, and for receiving a second modulated light signal and demodulating the second modulated light signal to produce a second electrical signal representative of second audio;

an optical link having a first end and a second end, the first end being coupled to the electro-optical interface for receiving the first modulated light signal and for transmitting the second modulated light signal;

an optical receiver coupled to the second end of the optical link for receiving the first modulated light signal, and for demodulating the first modulated light signal to produce a third electrical signal representative of the first audio;

a headset speaker element electrically connected with the optical receiver for receiving the third electrical signal and producing first sound waves based on the third electrical signal; and a microphone element coupled to the second end of the optical link for receiving the first modulated light signal and for transmitting the second modulated light signal, and for modulating the first modulated light signal to produce the second modulated light signal representative of the second audio;

wherein the microphone element comprises:

an electrical microphone for receiving second sound waves representative of the second audio and for producing a fourth electrical signal based on the second sound waves;

an electro-optical shutter electrically connected to the electrical microphone for receiving the first modulated light signal and modulating the first modulated light signal to produce the second modulated light signal, wherein the second modulated light signal is representative of the fourth electrical signal; and a directional optical coupler for receiving the first modulated light signal from the second end of the optical link and directing the first modulated light signal to the electro-optical shutter, and for receiving the second modulated light signal from the electro-optical shutter and directing the second modulated light signal to the second end of the optical link.

2. The electro-optical headset of claim 1, further comprising at least one electrical audio connector coupled with the electro-optical interface for receiving the first electrical signal from electronic equipment and for transmitting the second electrical signal to the electronic equipment.

3. The electro-optical headset of claim 1, wherein the optical receiver is a photo-voltaic cell.

4. The electro-optical headset of claim 1, wherein the electro-optical shutter is a liquid crystal display element.

5. The electro-optical headset of claim 1, wherein the electrical microphone is a piezoelectric microphone.

6. The electro-optical headset of claim 1 wherein the first modulated light signal is generated by a laser light emitting diode.

7. The electro-optical headset of claim 1 further comprising:
 a directional optical coupler for receiving the first modulated light signal from the second end of the optical link and directing the first modulated light signal to the optical receiver and the microphone element, and for receiving the second modulated light signal from the microphone element and directing the second modulated light signal to the second end of the optical link.

8. The electro-optical headset of claim 7 further comprising:
 an optical splitter for receiving the first modulated light signal from the directional optical coupler and directing the first modulated light signal to the optical receiver along a first optical path and directing the first modulated light signal to the microphone element along a second optical path.

9. The electro-optical headset of claim 1, further comprising:
 a directional optical coupler for receiving the first modulated light signal from the electro-optical interface and directing the first modulated light signal to the first end of the optical link, and for receiving the second modulated light signal from the first end of the optical link and directing the second modulated light signal to the electro-optical interface.

10. The electro-optical headset of claim 1, wherein the electro-optical interface comprises:
 a pulse width modulation circuit for receiving the first electrical signal and producing the first modulated light signal, wherein the first modulated light signal is pulse width modulated based on the first electrical signal; and
 a sample-and-hold circuit for receiving the second modulated light signal and producing the second electrical signal, wherein the second modulated light signal is amplitude modulated based on the second audio.

11. The electro-optical headset of claim 1 wherein the electro-optical interface comprises a semiconductor device for receiving the second modulated light signal, and wherein the semiconductor device is selected from the group consisting of a photodiode and a phototransistor.

12. A system comprising:
 a mobile station;
 an electro-optical interface for receiving a first electrical signal from the mobile station representative of first audio, and for producing a first modulated light signal based on the first electrical signal, and for receiving a second modulated light signal and demodulating the second modulated light signal to produce a second electrical signal for transmission to the mobile station representative of second audio;
 an optical link having a first end and a second end, the first end being coupled to the electro-optical interface for receiving the first modulated light signal and for transmitting the second modulated light signal;
 an optical receiver coupled to the second end of the optical link for receiving the first modulated light signal, and for demodulating the first modulated light signal to produce a third electrical signal representative of the first audio;
 a headset speaker element electrically connected with the optical receiver for receiving the third electrical signal and producing first sound waves based on the third electrical signal; and
 a microphone element coupled to the second end of the optical link for receiving the first modulated light signal and for transmitting the second modulated light signal, and for modulating the first modulated light signal to produce the second modulated light signal representative of the second audio;
 wherein the microphone element comprises:
  an electrical microphone for receiving second sound waves representative of the second audio and for producing a fourth electrical signal based on the second sound waves;
  an electro-optical shutter electrically connected to the electrical microphone for receiving the first modulated light signal and modulating the first modulated light signal to produce the second modulated light signal wherein the second modulated light signal is representative of the fourth electrical signal; and
  a directional optical coupler for receiving the first modulated light signal from the second end of the optical link and directing the first modulated light signal to the electro-optical shutter, and for receiving the second modulated light signal from the electro-optical shutter and directing the second modulated light signal to the second end of the optical link.

13. The system of claim 12, wherein the electro-optical shutter is a liquid crystal display element.

14. The system of claim 12, wherein the electrical microphone is a piezoelectric microphone.

15. The system of claim 12 wherein the first modulated light signal is generated by a laser light emitting diode.

16. An electro-optical headset comprising;
 a pulse width modulation circuit for receiving a first electrical signal representative of first audio and producing a first modulated light signal from a laser light emitting diode, wherein the first modulated light signal is pulse width modulated based on the first electrical signal;
 a sample-and-hold circuit for receiving a second modulated light signal in a photo-detector and producing a second electrical signal representative of second audio, wherein the second modulated light signal is amplitude modulated based on the second audio;
 a first directional optical coupler for receiving the first modulated light signal from the pulse width modulation circuit and directing the first modulated light signal to the first end of the optical link, and for receiving the second modulated light signal from the first end of the optical link and directing the second modulated light signal to the photo-detector in the sample-and-hold circuit;

an optical link having a first end and a second end, the first end being coupled to first directional optical coupler for receiving the first modulated light signal and for transmitting the second modulated light signal;

a second directional optical coupler coupled to the second end of the optical link for receiving the first modulated light signal from the second end of the optical link and for transmitting the second modulated light signal to the second end of the optical link;

a photo-voltaic cell coupled to the second directional optical coupler for receiving the first modulated light signal, and for demodulating the first modulated light signal to produce a third electrical signal representative of the first audio;

a headset speaker element electrically connected with the photo-voltaic cell for receiving the third electrical signal and producing first sound waves based on the third electrical signal, an optical splitter for receiving the first modulated light signal from the second directional optical coupler and directing the first modulated light signal to the photo-voltaic cell along a first optical path;

an electrical microphone for receiving second sound waves representative of the second audio and for producing a fourth electrical signal based on the second sound waves representative of the second audio; and a liquid crystal display element electrically connected to the electrical microphone for receiving the first modulated light signal along a second optical path from the optical splitter and modulating the first modulated light signal to produce the second modulated light signal, wherein the second modulated light signal is representative of the fourth electrical signal, and wherein the second modulated light signal traverses a third optical path and is received by the second directional optical coupler for transmission to the second end of the optical link.

* * * * *